United States Patent [19]

Dunfield et al.

[11] Patent Number: 5,260,618
[45] Date of Patent: Nov. 9, 1993

[54] SPACE OPTIMIZATION VOICE COIL MOTOR FOR DISC DRIVES

[75] Inventors: John C. Dunfield; Gunter Heine, both of Aptos, Calif.

[73] Assignee: Seagate Technology, Inc., Scotts Valley, Calif.

[21] Appl. No.: 797,019

[22] Filed: Nov. 25, 1991

[51] Int. Cl.⁵ .................... H02K 21/26; H02K 21/38; H02K 23/04
[52] U.S. Cl. ...................... 310/154; 310/13; 335/296
[58] Field of Search ............ 310/12, 13, 27, 156, 310/36, 154, 193; 360/98.07, 99.04, 99.08, 99.09, 99.11, 105, 106, 107, 108, 109; 335/296, 297, 304

[56] References Cited

U.S. PATENT DOCUMENTS

| | | | |
|---|---|---|---|
| 4,644,313 | 2/1987 | Miyajima | 335/296 |
| 4,908,816 | 3/1990 | Champagne et al. | 310/12 X |
| 5,005,095 | 4/1991 | Wagner | 310/36 X |
| 5,034,642 | 7/1991 | Hoemann et al. | 310/156 |
| 5,093,595 | 3/1992 | Korbel | 310/156 |

*Primary Examiner*—R. Skudy
*Assistant Examiner*—E. To
*Attorney, Agent, or Firm*—Edward P. Heller, III

[57] ABSTRACT

The present invention is directed to the structure of the permanent pole pieces, the permanent magnets and the bobbin of a voice coil motor. The poles, poles and permanent magnet(s) or poles, permanent magnets or any combination thereof are shaped in such a manner as to provide as large and constant magnetic flux field strength over a given area. The shaping of the components of the voice coil motor results in an altered external geometrical shape of the voice coil motor envelope, a reduced envelope for a motor of a given torque capability or both. The shaping of the poles, permanent magnets or bobbin allows the voice coil motor to consume less room within the disk drive housing.

6 Claims, 7 Drawing Sheets

SPACE OPTIMIZATION VOICE COIL MOTOR FOR DISC DRIVES

FIELD OF INVENTION

The present invention relates to voice coil motors utilized to actuate head arm assemblies in hard disk drives.

BACKGROUND OF INVENTION

Hard disc drives employ a variety of means for moving the head arm assembly across the magnetic medium. Head arm assemblies typically consist of a magnetic head for reading information from or writing information to a storage disk located at one end of the arm and some mechanism for moving the arm on the opposite end. One technique for moving the head arm assembly is utilization of an arm that pivots about an axis thereby extending the heads in an arcuate fashion across the area of the surface of the disk. The rotation motion may be accomplished by utilizing a voice coil and permanent magnet arrangement. Such a device is known as a rotary voice coil motor to those familiar with industry practices and techniques.

Alternatively, the voice coil motor may be adapted to move the head arm assembly along a straight radial line with respect to the storage disk. Such devices are referred to as linear voice coil motors and are well known in the prior art. Linear voice coil motors typically include a carriage assembly which reciprocally moves along one or more guide rails. The head assembly is affixed to the carriage assembly proximately located near the storage disk. A magnetic block assembly and voice coil, often symmetrical to the longitudinal centerline of the carriage assembly, generate force for moving the carriage assembly toward or away from the storage disk.

Both linear and rotary voice coil motor construction normally comprises a loop of wire containing numerous windings physically located between one or more permanent magnets. The windings are supported by and encircle a bobbin shaped in such a manner as to cooperate with the permanent magnet dimensions. The permanent magnet(s) are attached to pole devices and the entire apparatus is physically attached to the disc drive casing at the end of the head arm assembly not containing the magnetic heads. The wire loop of the voice coil contains electrical connections which enable the coil to carry a current thereby generating a magnetic field which interacts with the field of the permanently mounted permanent magnets on the poles. Either the permanent magnet(s) and respective pole(s) or the voice coil, may be attached to the head arm assembly. Typically the voice coil is attached because of its lighter weight and corresponding lower resultant force necessary to move the head arm assembly. Although further reference throughout this document will describe rotary voice coil motor applications, similar concepts are applicable to linear voice coil motors.

The torque capability of the rotary motor is dependent upon several factors. The strength of the permanent magnet field in the voice coil region, temperature, number of windings, and material composition and uniformity all contribute to available torque. The torque generated between the conflicting magnetic field of the current carrying voice coil and the permanent magnets is proportional to the amount of electrical current in the coil and results in the head arm assembly rotating about its pivot axis.

Magnetic disk drives are becoming increasingly smaller in order to meet the portability requirements of lap-top and notebook computers. Along with the smaller drive size are the attendant problems of less space to place component assemblies such as the voice coil motor. It is therefore crucial that the flux field generated by the permanent magnet and poles of the voice coil motor provide maximum constant torque over the pole area.

SUMMARY OF THE INVENTION

The present invention is directed to the structure of the voice coil motor. Specifically, a variety of embodiments are disclosed which provide for maximized torque over a given pole area for a given motor dimensional envelope. One embodiment of the present invention consists of a voice coil motor in which the physical profile of the poles for the voice coil motor are sloped from the outermost edges toward the center from each direction thereby providing a medium for constant flux density and elimination of physical dimensions of a rectagular shaped pole piece.

Another embodiment of the present invention consists of a convex pole piece shaped and fitted adjacent to a concave permanent magnet for both the top and bottom voice coil motor sub assembly. This technique of shaping the pole and permanent magnet such that the resultant combined pieces form a rectangular shaped structure may result in a pole and permanent magnet approximately half the size of the normal dimensions of the pole and permanent magnet. Additionally it should be kept in mind that any of the previous techniques may be utilized on just one side or any portion of the voice coil motor magnetic circuit assembly.

Yet another embodiment of the present invention consists of shaping the bobbin of the voice coil motor and the permanent magnets or pole pieces in order to accomplish the objectives of this invention.

A more complete understanding and specific description of objects, features and advantages of this invention are set forth in the accompanying drawings and description.

DETAILED DESCRIPTION OF THE PREFERRED EMBODIMENTS

Figure 1:
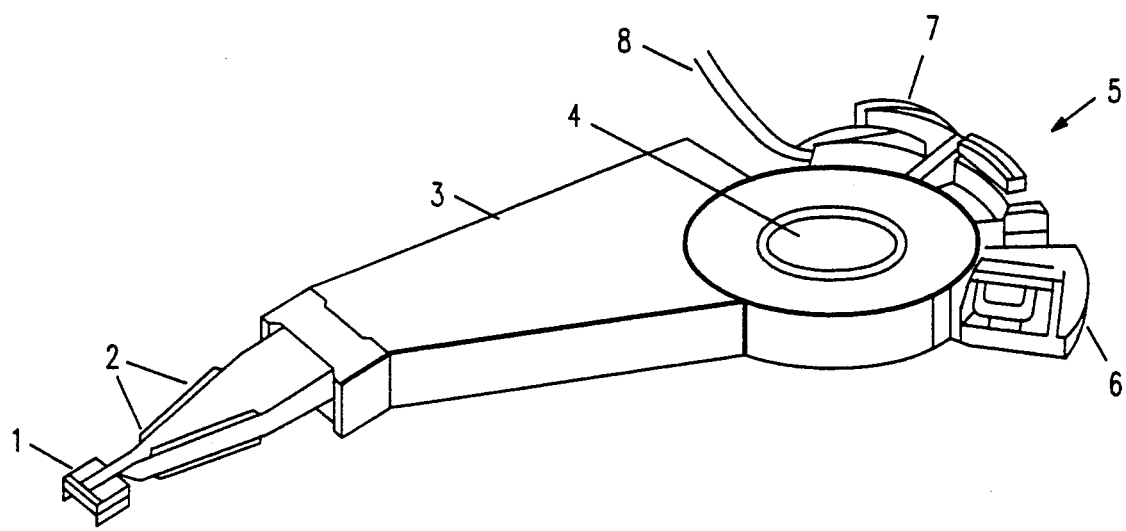
FIG. 1 is a perspective view of a head assembly with the voice coil exposed as known in the prior art.

Referring now to the drawings wherein like items are referenced as such throughout, FIG. 1 is a head arm assembly of a hard disk drive including an exposed actuator mechanism. A magnetic head 1 is shown attached to flexures 2 which in turn are connected to an actuator arm 3. The actuator arm 3 is mounted to a pivot bearing 4 allowing the entire assembly to rotate about the pivot. Actuator mechanism 5 is attached to the actuator arm at an end opposite the magnetic head.

As shown actuator mechanism 5 depicts a rotary voice coil motor although the present invention would also be applicable to alternate actuator mechanisms. VCM 5 is comprised of a curved magnetic circuit assembly 6 (shown in a cutaway view) and a voice coil 7. The voice coil 7 has electrical leads 8 which provide a connection point for applying current to the coil. Coil 7 is affixed to a bobbin (not shown) which is mounted to actuator arm 3.

The entire head arm assembly is constructed as above described in order that the head 1 may move across the surface area of an information storage disk (not shown) in response to the force created by the reaction between the generated magnetic field of voice coil 7 and permanent magnet 6. The equation for the developed torque is derived from the basic law for electromagnetic torque:

$$T = B \times L \times I \times N \times R$$

Where,
T = torque
B = effective flux density in the air gap
L = effective coil length
I = current in the coil
N = number of turns of wire on the coil
R = radius The above equation illustrates that the torque T, is directly proportional to the flux density of the field in which the coil rotates B, the current in the coil I, and the coil constants L, N and radius R. Increasing the radius, coil length or number of turns increases the physical dimension requirements of the actuator mechanism. Typically, the volume (height) of new disk drives of a form factor of 1.8 or 2.5 inches have dimensional constraints that preclude the normal practice of increasing pole or magnet thickness for providing an increased torque constant. These same drives (1.8 and 2.5 inch form factor) require lower current values. Additionally, current values are limited by available source and the current carrying capacity of the wire. Similarly, trends to lower operating voltages in small disk drives restrict or prohibit increasing the number of turns N in the coil because of the associated increase in resistance. Thus, in order to maintain a high value for torque T while simultaneously minimizing the physical dimensions of actuator elements, the flux density B must be maximized.

Figure 2:
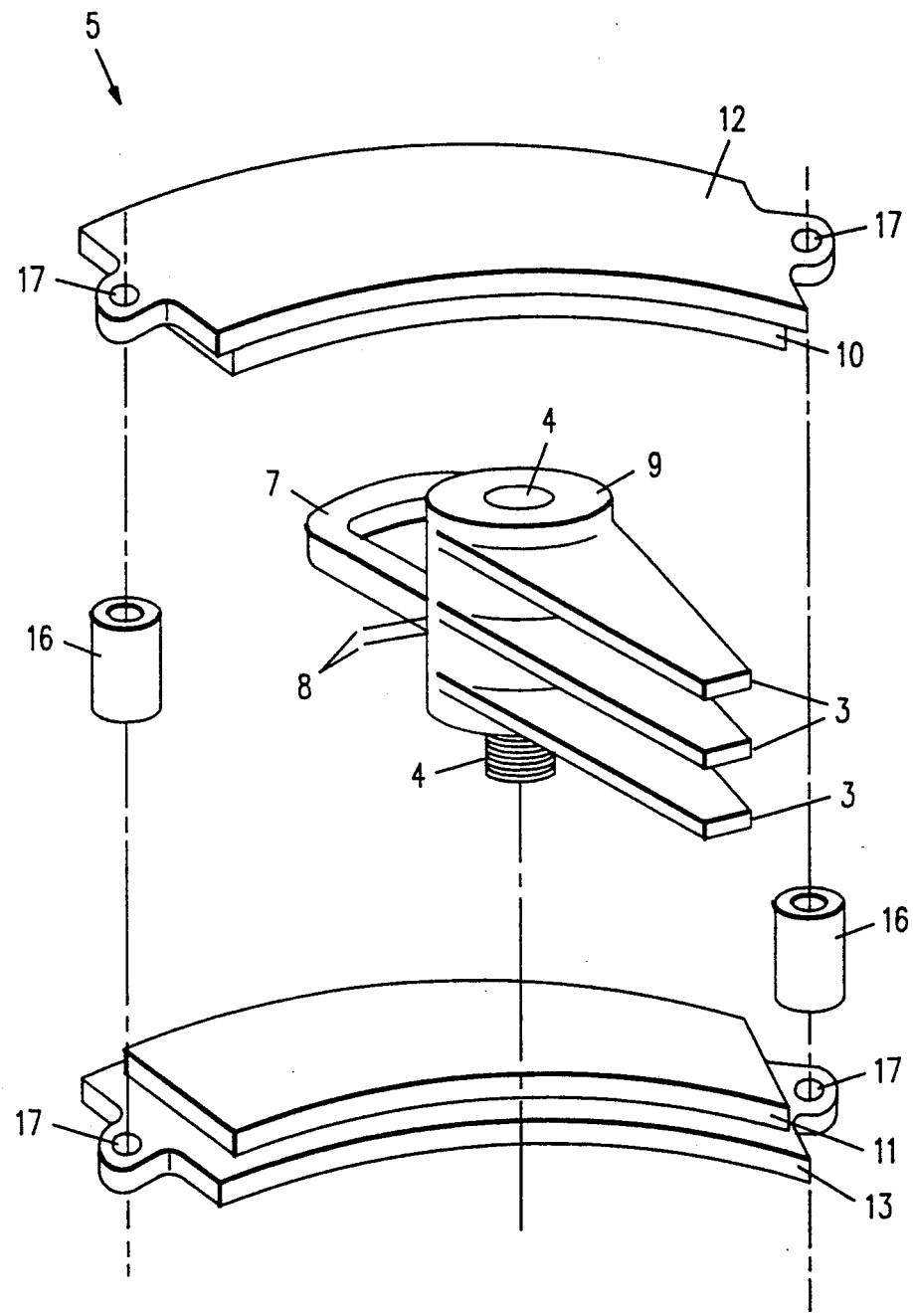
FIG. 2 is an exploded isometric view of a rotary voice coil motor as known in the prior art.

FIG. 2 is an exploded isometric view of a voice coil motor of the prior art. An upper permanent magnet 10 and a lower permanent magnet 11 are mounted to an upper pole piece 12 and a lower pole piece 13, respectively. An actuator body 9 is mounted to a pivot bearing 4 so that the actuator body 9 is free to rotate about pivot shaft 4.

The actuator body 9 includes a number of actuator arms 3 which may be an integral part of the actuator body 9 or separately fabricated and fastened thereto using conventional manufacturing means such as welding or riveting. Also fixedly attached to the actuator body 9 is a coil and bobbin assembly 7, having two connections 8 for linking the coil to electronic circuitry (not shown) for carrying a current through the coil 7.

When VCM 5 is assembled into a disc drive apparatus (not shown) the lower pole piece 13 may be supported by or integrally formed with the bottom cover of the drive. Pivot shaft 4 may also be mounted to the bottom cover of the drive with the coil and bobbin 7 overhanging the lower permanent magnet and serving as a counterbalance for the actuator body 9. Spacers 16 are placed between mounting holes 17 in the lower pole piece 13 and the upper pole piece 12. Assembly is normally completed by attaching pole pieces 12 and 13 along with spacers 16 to the bottom cover of the drive by the use of fastening means (not shown) through mounting holes 17.

Coil and bobbin assembly 7 are disposed between the upper and lower permanent magnets 10 and 11 with a narrow air gap 19 separating the surfaces of the magnets 10 and 11 from coil and bobbin assembly 7. When DC current is applied to the electrical leads 8, a resulting magnetic field is created about the coil and bobbin assembly 7. The magnetic field generated by the current carrying coil interacts with the magnetic field of permanent magnets 10 and 11 to cause the actuator body 9 to rotate about the pivot shaft 4, thereby moving the heads across the storage disks. The pole pieces 12 and 13 along with spacers 16 form the mechanical support structure for permanent magnets 10 and 11. The mechanical support structure may be formed from steel or other magnetically permeable material to form a secondary flux path for the magnets 10 and 11.

Figure 3:
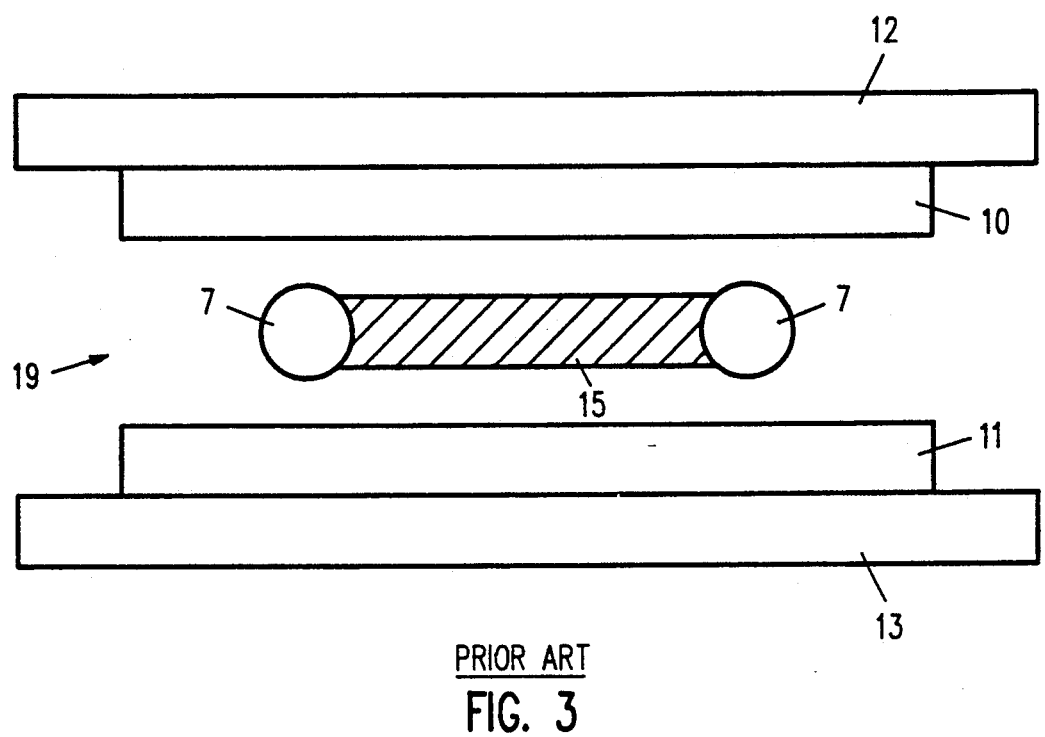
FIG. 3 is a cross sectional view of a voice coil motor as known in the prior art.

FIG. 3 is a cross section of a magnetic circuit assembly as known in the prior art. The drawing illustrates an upper pole piece 12, an upper permanent magnet 10, a lower pole piece 13, a lower permanent magnet 11, a voice coil 7, and a bobbin 15. The flux from the magnetic circuit travels through air gap 19 and interacts with the magnetic field generated by the current passing through the voice coil 7. Although a flux return path from upper pole piece to lower pole piece is not depicted, industry practice often utilizes spacers (as in FIG. 2) or other means for providing a closed flux circuit. The interaction of the force from the magnetic circuit and the magnetic force generated in the voice coil produces a resulting torque which causes movement of the head arm assembly about the pivot bearing 4.

Pole pieces 12 and 13 act to shield the flux of the voice coil from the magnetic heads. In order to maximize efficiency of the voice coil motor, it is desirable to keep the flux density relatively low and constant in order to decrease the likelihood of flux leaking thereby lessening the available torque for head arm movement and correspondingly decreasing voice coil motor efficiency.

Figure 4:
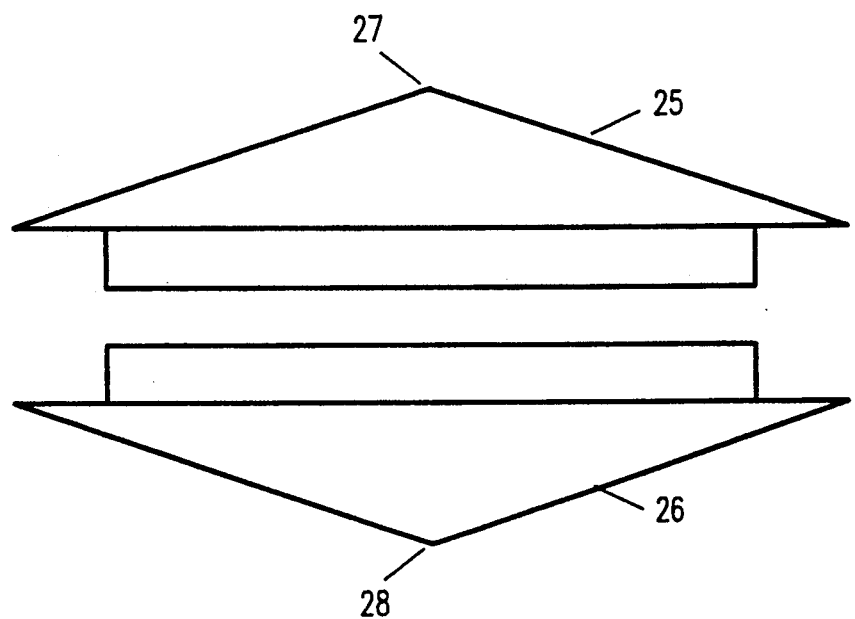
FIG. 4 is also a cross sectional view of a magnetic circuit assembly of an alternate embodiment of the present invention.

FIG. 4 illustrates a cross sectional view of the magnetic circuit assembly of a voice coil motor that incorporates an embodiment of the present invention. With respect to the upper pole piece 25 and lower pole piece 26 the physical profile has been altered so as to form triangular shaped pole pieces with apexes 27 and 28 away from the permanent magnets. The resultant savings in space allows for more compact packing around the voice coil motor and also provide an alternative of protruding the apexes of the voice coil motor pole pieces through the casing of the disk drive assembly (not shown).

Figure 5:
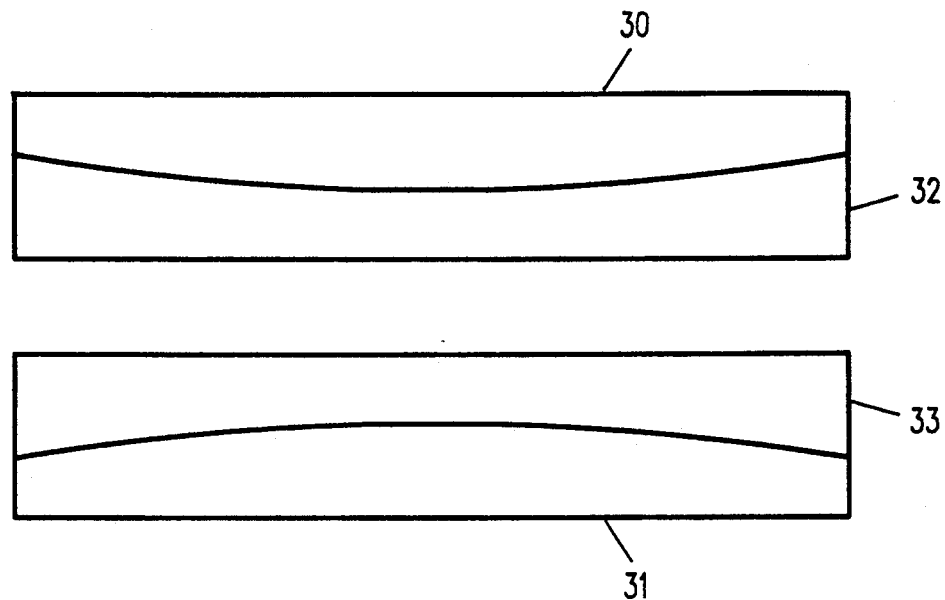
FIG. 5 is also a cross sectional view of a magnetic circuit assembly of an alternate embodiment of the present invention.

FIG. 5 illustrates an alternative embodiment of the present invention. In FIG. 5 the poles 30 and 31 and the permanent magnets 32 and 33 are convex and concave respectively at their adjacent surfaces, thereby creating an overall smaller physical envelope than the prior art shown in FIG. 3 or the embodiment as shown in FIG. 4. Again, as with FIG. 4, shaping the poles and the permanent magnets as in FIG. 5 results in a greater flux density in the air gap of the voice coil motor.

Figure 6:
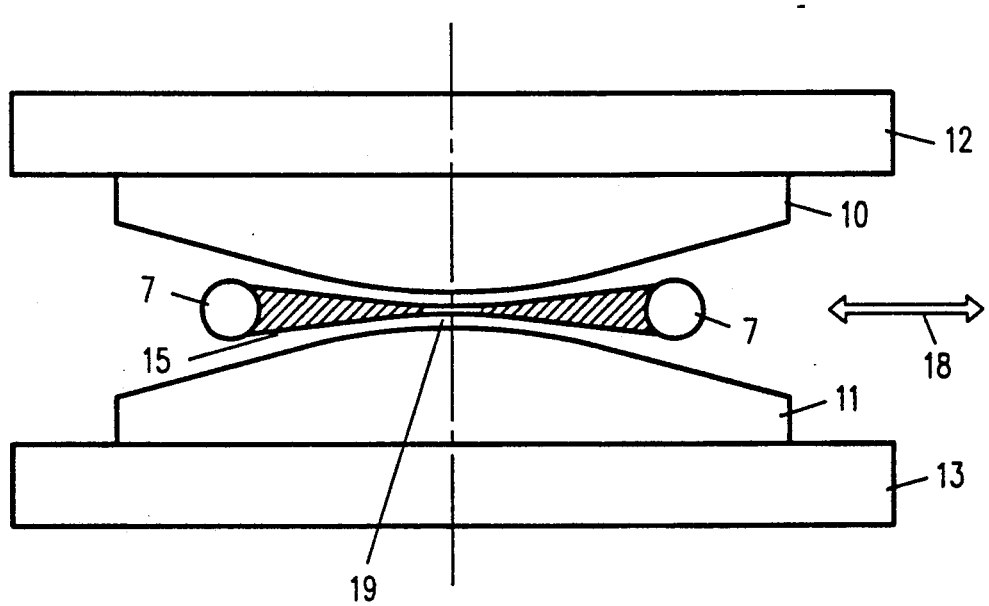
FIG. 6 is a cross sectional view of a voice coil motor which incorporates one embodiment of the present invention.

FIG. 6 illustrates yet another embodiment of the present invention. The upper and lower permanent magnets 10 and 11 and the bobbin 15 have all been shaped to collectively maximize torque capability. During operation of the VCM, coil 7 and bobbin 15 move laterally in the direction depicted by arrow 18. The upper and lower permanent magnets 10 and 11 are shaped in a convex manner away from their respective pole pieces. The reduced thickness of air gap 19 in the region defined by the sloped magnet surfaces is accommodated by constricting the thickness of bobbin 15 along the area of its midsection. The reduced bobbin size provides clearance for lateral movement along arrow 18 when either or both upper and lower permanent magnet has a convex shape away from its respective permanent pole piece. The resultant savings in space allows for more compact packing around the voice coil motor and also provide an alternative of protruding the apexes of the voice coil motor pole pieces through the casing of the disk drive assembly (not shown).

The voice coil motor components, the pole, permanent magnets and wire consist of known elements. Typically, poles are of iron content, permanent magnets may be of neodymium type, and the wire may be of aluminum or copper. Motors constructed of the preceding materials are sufficient for purposes of the present invention.

Figure 7A:
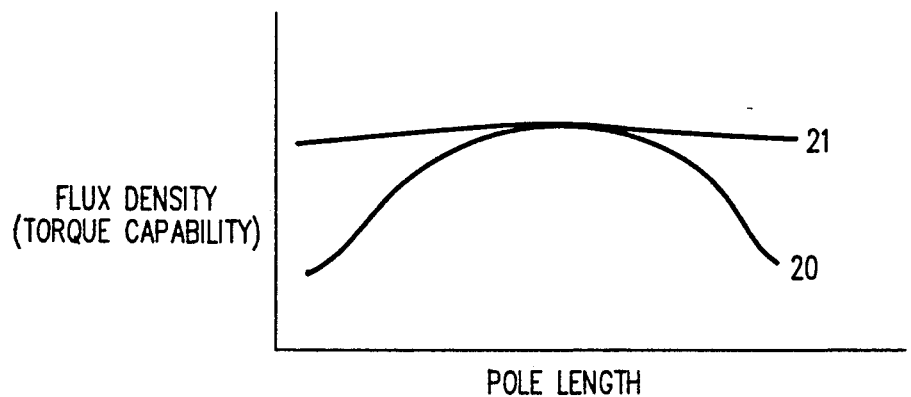
FIG. 7A is a graphical representation of the torque capability of voice coil motor with and without the current invention.

Line 20 of FIG. 7A, represents a typical flux density profile and correspondingly proportional available torque, across the length of the permanent magnet and pole of a VCM constructed in accordance with the prior art techniques. Line 21 of FIG. 7A represents the flux density curve across the length of the permanent magnet and pole of a VCM having profiled components as earlier described. The relative flatness of line 21 across the length of the pole piece results in increased available torque, thus exhibiting conformance with the teachings of the present invention.

Specific embodiments of a concave magnet and a convex magnet were manufactured having the general shape depicted in FIGS. 5 and 6. The magnets were comprised of neodymium, iron and boron and had an electro nickel plate coating of 0.0004 to 0.0006 millimeters in thickness. The magnets had a nominal thickness of 1.40 millimeters with a concave cavity of a convex protrusion of approximately 0.25 millimeters at its lowest or highest point respectively. The available torque with respect to motors constructed from these magnets is illustrated in FIG. 7B.

Figure 7B:
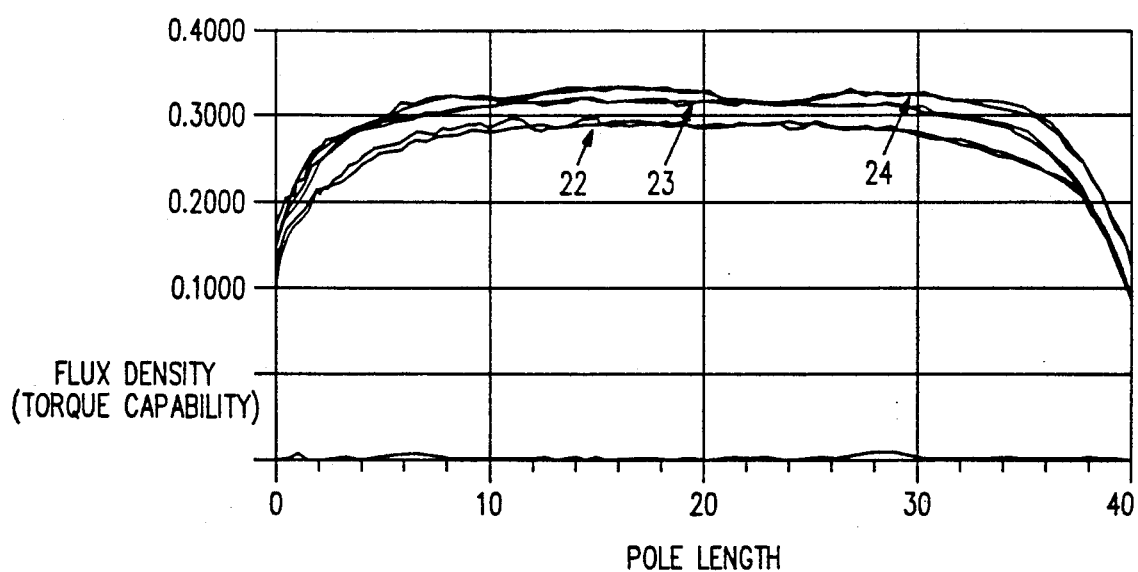
FIG. 7B is a plot of specific test results of the torque capability of voice coil motor with and without the current invention.

The plotted flux density for the flat (prior art), convex and concave magnets are represented as lines 22, 23 and 24 respectively in FIG. 7B. These results were obtained using similar test equipment under similar conditions and illustrate the increased flux density associated with shaping of the magnet. Line 22 of FIG. 7B, is a plot of flux density profile and correspondingly proportional available torque, across the length of the permanent magnet and pole of a voice coil motor constructed in accordance with the pole and permanent magnet attributes of FIG. 3 (prior art magnet). Lines 23 and 24 plot flux density across the length of the permanent magnet and pole of a voice coil motor constructed in accordance with FIGS. 5 and 6 relative. The relatively flatness of lines 23 and 24 is attributable to profiling the pole pieces in the fashion described above and generally provides an increased flux density over the entire length of the magnetic circuit.

Figure 8:
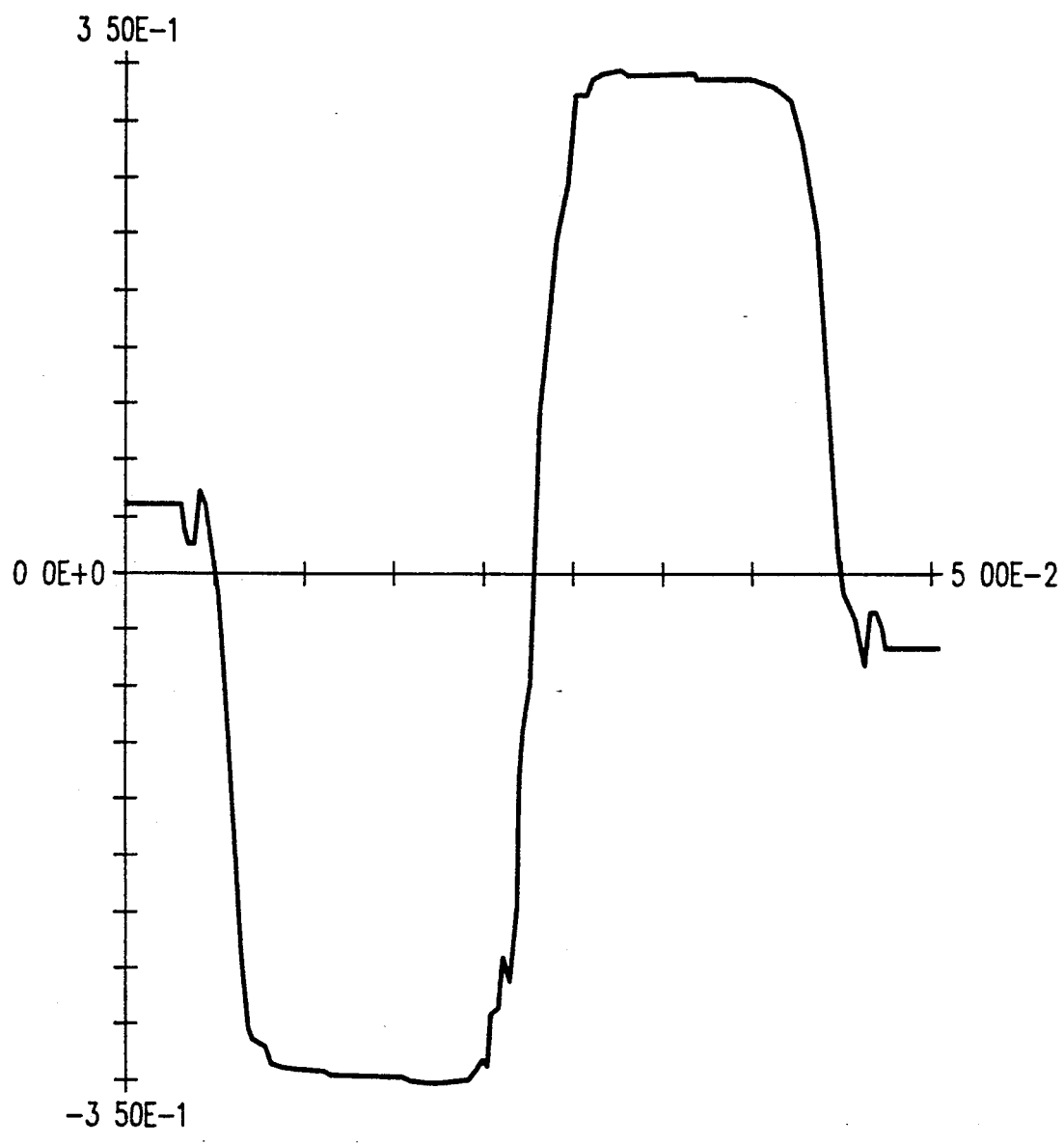
FIG. 8 is a graphical representations of measured flux density along the linear dimension of a magnetic circuit assembly of prior art construction.

FIG. 8 shows a graphical representation of the flux density of a voice coil motor constructed in accordance with the prior art as depicted in FIG. 3.

Figure 9:
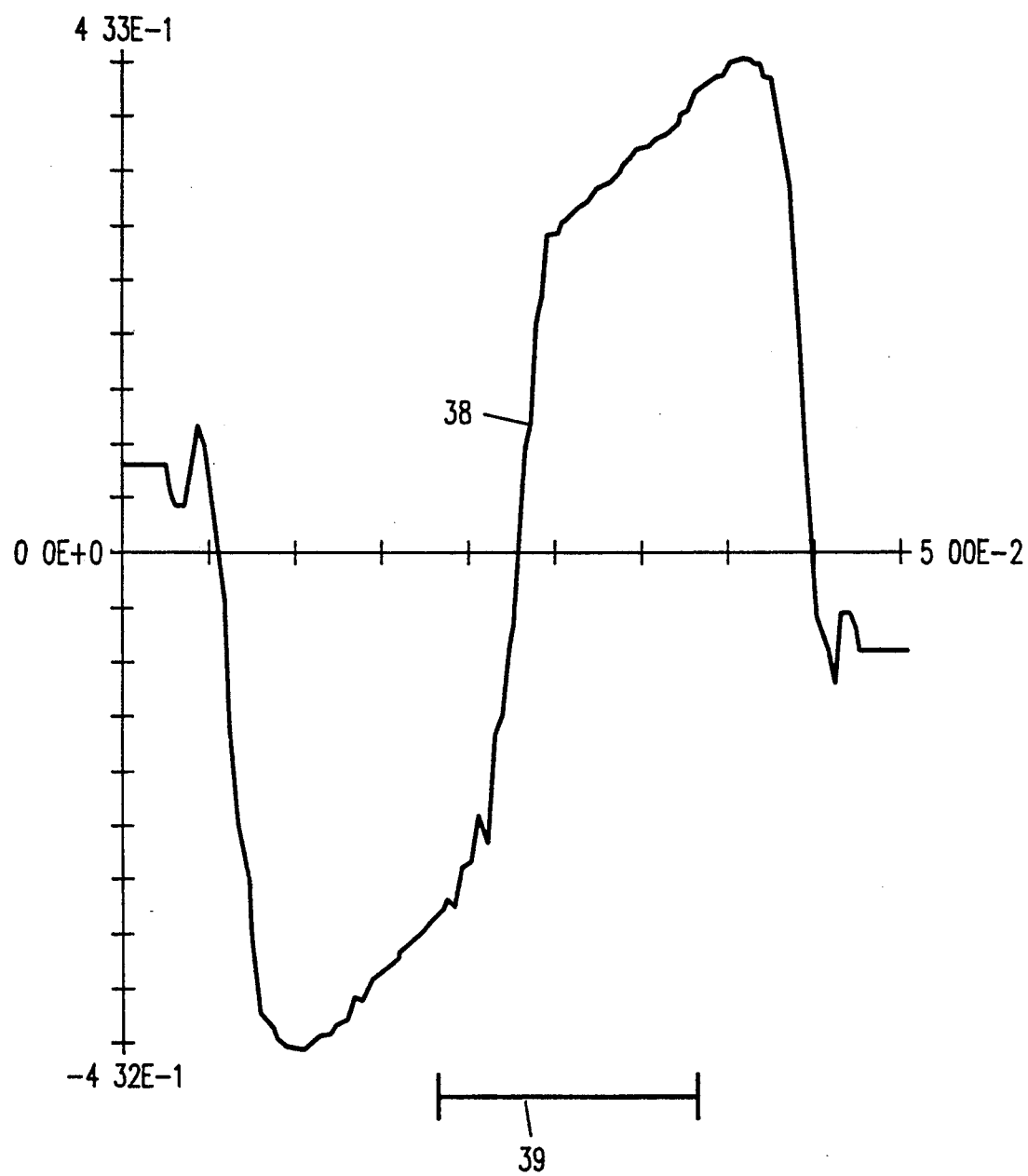
FIG. 9 is a graphical representations of measured flux density along the linear dimension of a magnetic circuit assembly incorporating an embodiment of the present invention.

FIG. 9 shows a graphical representation of the resulting flux density of a voice coil motor which utilizes the teachings illustrated in FIG. 5 and has the same pole length as the motor of FIG. 8. As illustrated in FIG. 9, the shaped pole(s) and permanent magnet(s) result in an increased magnetic flux density in the air gap as compared to the prior art construction technique. In addition, the increased flux density provides a more linear torque angle profile than the prior art. As can be seen on line 38 of FIG. 9, as the flux density in the transition zone 39 of the magnetic field decreases on one half of the voice coil motor the flux density on the other half of the motor is higher resulting in a torque that is flatter over a wider angle than the prior art.

Though the embodiments described above represent only a few cases, various combinations may be utilized with profiled permanent magnets and pole pieces on one side and not the other thereby providing a variety of implementations of the present invention. Additionally, the voice coil motors described herein have only illustrated one pair of permanent magnets. It is well known in art that a plurality of pairs of permanent magnets may be utilized in voice coil motor construction. Accordingly, any combination of profiled pole and permanent magnet pieces may be utilized in optimizing available space and providing maximum torque from any given combination.

What is claimed is:

1. A flat voice coil motor comprising:
    a pole piece;
    a magnet associated with and having a side opposite said pole piece;
    said side of said magnet defining a protrusion extending about a magnetic pole transition center line; and
    a voice coil positioned proximate the protrusion of said magnet.

2. The voice coil motor of claim 1 wherein said voice coil includes one or more constricted dimensions proximate the protrusion of said magnet.

3. The voice coil motor of claim 1 having a plurality of pole pieces.

4. The voice coil motor of claim 3 having a plurality of opposing magnets each associated with a respective one of said pole pieces.

5. A voice coil motor having a magnetic flux path which includes an air gap wherein adjoining areas of oppositely directed magnetic flux define a magnetic pole transition line, the motor comprising:
 a pole piece;
 a magnet associated with said pole piece; and
 a voice coil positioned in the air gap;

said pole piece having increased cross section proximate the magnetic pole transition line.

6. The voice coil motor of claim 5 wherein said magnet and said pole piece define a combined structure having a substantially rectangular cross section.

* * * * *